United States Patent [19]

Früchtenicht

[11] 4,091,256
[45] May 23, 1978

[54] PULSED ATOMIC BEAM APPARATUS

[75] Inventor: Joseph Fred Früchtenicht, Torrance, Calif.

[73] Assignee: The United States of America as represented by the Secretary of the Air Force, Washington, D.C.

[21] Appl. No.: 541,486

[22] Filed: Jan. 16, 1975

[51] Int. Cl.² .............................................. H05H 1/04
[52] U.S. Cl. ............................ 219/121 L; 219/121 P; 313/231.3; 315/111.2; 176/1; 176/9
[58] Field of Search ........ 219/121 L, 121 LM, 121 P; 176/1, 3, 9; 313/231.3; 315/111.2; 33/66; 331/94.5, DIG. 1

[56] References Cited

U.S. PATENT DOCUMENTS

| | | | |
|---|---|---|---|
| 3,723,246 | 3/1973 | Lubin | 219/121 L |
| 3,756,344 | 9/1973 | Daiber | 176/1 X |
| 3,764,466 | 10/1973 | Dawson | 176/3 X |
| 3,935,504 | 1/1976 | Guillaneux et al. | 176/1 X |

Primary Examiner—J. V. Truhe
Assistant Examiner—Mark H. Paschall
Attorney, Agent, or Firm—Joseph E. Rusz; William Stepanishen

[57] ABSTRACT

An atomic beam apparatus for producing pulsed beams of neutral atomic particles.

3 Claims, 2 Drawing Figures

PULSED ATOMIC BEAM APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an atomic beam generating apparatus and in particular to a pulsed atomic beam generator apparatus.

In the prior art, there are three basic types of atomic beam generating systems which are currently being utilized. The first type is the effusive nozzle source wherein gaseous material within a heated oven is permitted to escape through a small aperture. A series of apertures and a pumping system are used to collimate the effusing gas into a narrow beam. The effusive source is characterized by a mean free path within the oven greater than the aperture diameter. The second type of atomic beam source also utilizes a heated oven. However, the source gas is expanded through a hypersonic nozzle, thereby obtaining a higher velocity gas stream than is possible with the simple effusive source. The useful beam intensities which are achieved are only in the energy region of less than one electron-volt. Less intense atomic beams having higher energy may be obtained by the third method which uses charge exchange collisions with a static gas to neutralize the high velocity ions that may be obtained from any of a number of ion source types.

SUMMARY OF THE INVENTION

The present invention utilizes a short duration laser beam operating in the pulsed mode to provide an atomic beam through the vaporization and heating of a solid target material. The high intensity laser beam pulses are utilized for the irradiation of a thin layer of material which is to be vaporized to produce a pulsed beam of neutral atomic particles.

It is one object of the invention, therefore, to provide an improved pulsed atomic beam generating apparatus producing pulsed beams of neutral atomic particles.

It is another object of the invention to provide an improved pulsed atomic beam generating apparatus having a useful energy range from a small fraction of an electron-volt to tens of electron volts.

It is still another object of the invention to provide an improved pulsed atomic beam generating apparatus utilizing a high intensity laser beam pulses for vaporizing and heating a leyered solid target material for producing pulsed atomic beams.

These and other advantages, features and objects of the invention will become more apparent from the following description taken in connection with the illustrative embodiment in the accompanying drawings.

DESCRIPTION OF THE PREFERRED EMBODIMENT

Figure 1:
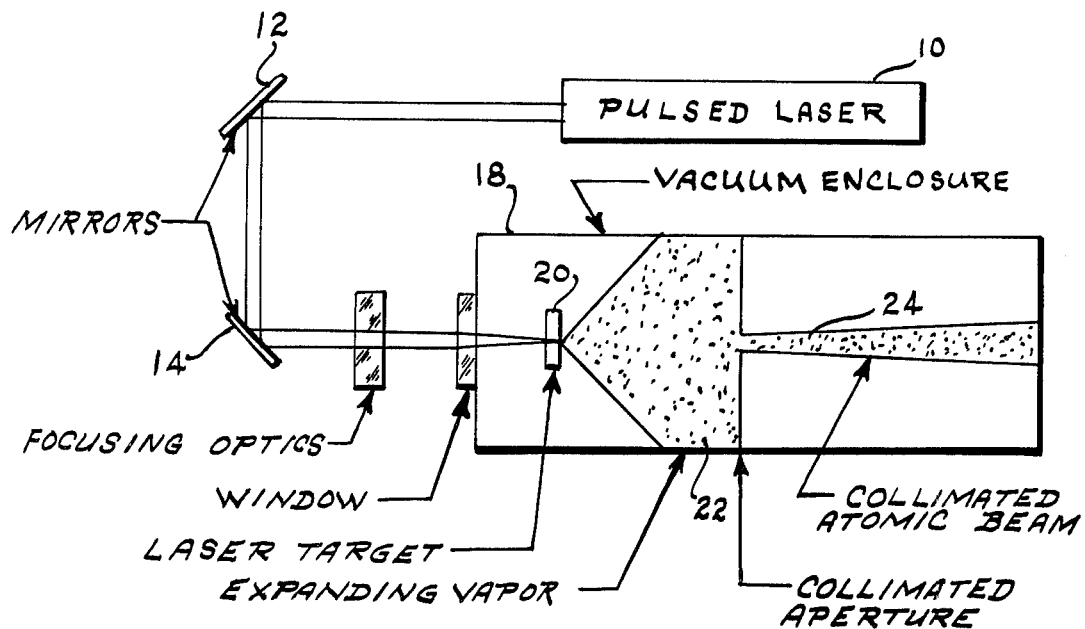
FIG. 1 is a schematic diagram of the pulsed atomic beam generating apparatus in accordance with the the present invention, and, FIG. 2 is a detailed diagram of the laser target of FIG. 1.

Referring now to FIG. 1, there is shown a pulsed atomic beam generating apparatus utilizing a pulsed laser 10 to provide a laser beam. The laser beam is directed by mirrors 12, 14 and focused by lens 16 into the vacuum enclosure 18. The vacuum enclosure 18 contains a target 20 which is positioned to intercept the laser beam and a vacuum chamber 22 which allows the vaporized target material to expand. A collimated aperture 24 is connected to the vacuum chamber 22 to collimate the high pressure high temperature vapor cloud into a pulsed atomic beam having short duration bursts.

Figure 2:
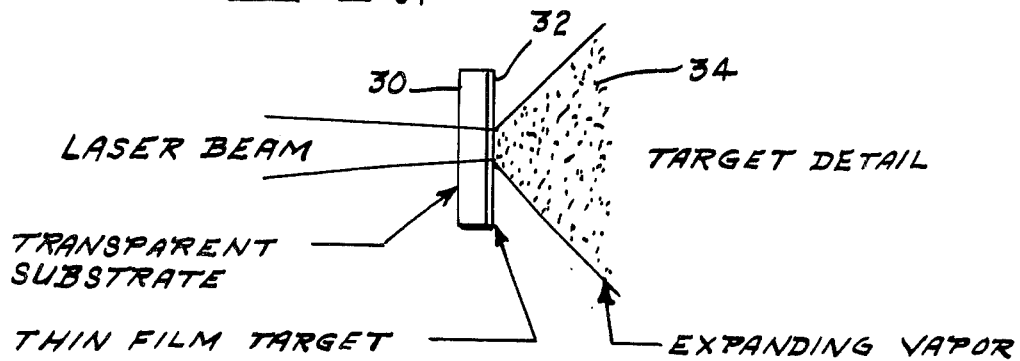

There is shown in FIG. 2 in greater detail the laser target of FIG. 1. The laser target comprises a transparent substrate 30 and a thin film target material 32 deposited thereupon. The laser beam passes through the transparent substrate 30 and vaporizes the thin film material 32 which expands as a cloud vapor 34 into the vacuum chamber of the vacuum enclosure.

The present invention produces atomic beams with pulsed beams of neutral atomic particles. The pulsed beam results from the vaporization and heating of solid target material by means of a short-duration laser beam pulse. The invention is characterized by the production of neutral atoms rather than ionized species that usually results from the irradiation of solid targets with high intensity laser beam pulses is the form of the laser beam target. In the present invention, a thin layer of a suitable target material which is to be vaporized is deposited on a transparent substrate. The light beam from the laser passes through the transparent substrate and impinges upon the surface of the thin layer target material which is in contact with the substrate. The absorption of the radiant energy converts the solid material into a high-pressure high-temperature vapor cloud that expands freely into the surrounding vacuum region. An observer stationed a remote distance from the laser beam target would observe a short duration burst of atoms traveling in straight line trajectories radially outward from the irradiation side. This burst of atoms constitutes the pulsed atomic beam output.

The general process of irradiating solid material with laser beams has applications which range from cutting cloth to producing exceedingly hot plasmas for fusion reactors. However, the particular atomic beam generating apparatus herein described results in the formation of a predominantly neutral stream of atoms which is a significant advancement of the present technology. Range of laser beam parameters as herein presented, have been established to yield the desired atom beam characteristics. In the prior art, experiments have shown that the irradiation of the free surface of either a solid block of material or a thin film of material with a laser beam pulse with this same range of parameters results in the formation of a highly ionized plasma in contrast to the neutral cloud which is produced by irradiation utilizing the atomic beam generating apparatus as described above. Evidently, irradiation of a free surface initially vaporizes a small amount of material which simultaneously absorbs the laser light energy and shields the solid surface from the radiant energy resulting in the formation of a very hot ionized plasma that is free to expand into the surrounding vacuum. Although the same process may occur in the other geometry, the hot vapor is physically constrained from expanding until it has ingested a significant fraction of the remaining film. By this time the vapor cloud has cooled so when the film finally fails, either by rupture or by being absorbed into the vapor, a vapor cloud of moderate temperature only is free to escape into the vacuum chamber.

The significant characteristics of the present atomic beam pulses which are produced by the present apparatus are as follows: (1) The atom energy;-each pulse contains a range of atoms that may be characterized approximately by a Maxwellian distribution. The mean velocity may be adjusted over a reasonable range by selection of laser beam pulse parameters. The useful energy range extends from a small fraction of an electron-volt to tens of electron volts. The pulse has the desirable characteristic that the transit time of an atom from the point of formation to a remote distance uniquely specifies its velocity providing that the transit time is long compared to the duration of the laser beam pulse.

(2) The atom beam intensity; even with a laser beam pulse of moderate energy (1 joule) the intensity of the atom beam pulse at a workable distance from the source is larger than that than can be achieved by other types of atomic beam sources in the energy range given above. As an example, a flux greater than $10^{17}$ atoms $cm^{-2} sec^{-1}$ was obtained for 4 eV fluorine atoms at a distance of 60 cm from the source.

(3) The atomic species;-the approach appears to be compatible with any atomic (and some molecular) species. The principle requirement is that the atomic species be stable in either elemental or compound form. Metals are particularly well suited since most of them can be handles in thin film form. Sintered powders have been used as targets for producing beams of atomic species that are normally gaseous. Tightly bound molecular species apparently can survive the high temperatures without excessive dissociation. However, the tightly bound atoms are more difficult to dislodge from the parent molecule.

The present atomic beam generating apparatus has been tested with a Q-switch ruby laser with a maximum energy capability of about 1 joule per pulse. The pulse duration was on the order of 100 nanoseconds. The energy density at the target was varied in the range from about 10 to 100 joules $cm^{-2}$ per pulse (obtained by focusing the laser beam with a simple lens). It has been found that laser beam energy desities in excess of the 100 joules $cm^{-2}$ level result in excessive ionization while energy densities less than 10 jounes $cm^{-2}$ results in incomplete vaporization. The target film thickness were in the order of a few microns which are compatible with the one-joule system. The laser bombardment conditions may be adjusted to obtain given atom beam characteristics which depend upon physical properties of the target (e.g. reflectivity).

Although the invention has been described with reference to a particular embodiment, it will be understood to those skilled in the art that the invention is capable of a variety of alternative embodiments within the spirit and scope of the appended claims.

What is claimed is:

1. A pulsed atomic beam generating apparatus comprising in combination:

means for forming a pulsed laser beam, alignment means for receiving said pulsed laser beam, said alignment means controlling the optical alignment of said pulsed laser beam, and beam forming means receiving said pulsed laser beam, said beam forming means being responsive to said laser beam, said beam forming means forming a collimated atomic beam, said beam forming means comprises in combination:

an enclosure having a window at one end thereof, said window being transparent to said pulsed laser beam, said enclosure having a target, a vacuum chamber and a collimating aperture positioned therein, said target being optically aligned with said window to receive said pulsed laser beam, said vacuum chamber encompassing the area of said target where said laser beam impinges, and a collimating aperture connected to said vacuum chamber, said vacuum chamber having atomic particles therein, said collimating aperture forming said atomic particles into a pulsed atomic beam, said target comprises a transparent substrate with a thin film deposited thereon, said transparent substrate being optically aligned with said window and said pulsed laser beam, said thin film being encompassed by said vacuum chamber, said pulsed laser beam vaporizing said thin film to form a vaporized cloud in said vacuum chamber, said vaporized cloud containing atomic particles.

2. A pulsed stomic beam generating apparatus as described in claim 1 wherein said atomic particles are neutral atoms.

3. A pulsed atomic beam generating apparatus as described in claim 1 wherein said collimated aperture is in optical alignment with said target and said pulsed laser beam.

* * * * *